United States Patent
Chin (10) Patent No.: US 9,023,543 B2
(45) Date of Patent: May 5, 2015

(54) TEMPERATURE-SENSITIVE BYPASS DEVICE FOR DISCHARGING CONDENSED WATER FROM FUEL CELL STACK

(75) Inventor: Sang Mun Chin, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 439 days.

(21) Appl. No.: 13/079,227

(22) Filed: Apr. 4, 2011

(65) Prior Publication Data

US 2012/0107704 A1     May 3, 2012

(30) Foreign Application Priority Data

Nov. 2, 2010 (KR) ................. 10-2010-0108063

(51) Int. Cl.
*H01M 8/04* (2006.01)
*H01M 8/06* (2006.01)
*H01M 8/24* (2006.01)

(52) U.S. Cl.
CPC ........ *H01M 8/04291* (2013.01); *H01M 8/2465* (2013.01); *Y02E 60/50* (2013.01)

(58) Field of Classification Search
USPC ................................... 429/414, 457
See application file for complete search history.

(56) References Cited

U.S. PATENT DOCUMENTS

| 3,441,444 A | * | 4/1969 | Chesner et al. | ............... | 429/434 |
| 2003/0219644 A1 | * | 11/2003 | Inai et al. | ........................ | 429/38 |
| 2006/0110650 A1 | * | 5/2006 | Sugiura et al. | ................... | 429/38 |
| 2007/0218326 A1 | | 9/2007 | Liu et al. | | |

FOREIGN PATENT DOCUMENTS

| JP | 2004111196 A | | 4/2004 |
| JP | 2009064619 A | * | 3/2009 |
| KR | 1020060130957 A | | 12/2006 |
| KR | 700073 B1 | * | 3/2007 |
| KR | 10-0837913 | | 6/2008 |
| KR | 10-2009-0100736 | | 9/2009 |
| KR | 10-2009-0109275 | | 10/2009 |

OTHER PUBLICATIONS

Baek et al., Machine translation of KR 700073 B1, Mar. 2007.*
Kuwabara, Y., Machine translation of JP 2009-064619 A, Mar. 2009.*

* cited by examiner

*Primary Examiner* — Sean P Cullen
(74) *Attorney, Agent, or Firm* — Mintz Levin Cohn Ferris Glovsky and Popeo, P.C.; Peter F. Corless (57) ABSTRACT

The present invention provides a temperature-sensitive bypass device for discharging condensed water from a fuel cell stack, in which a bypass line is provided between an end plate and a separator located at the outermost cell adjacent to an inlet of the fuel cell stack, and a temperature-sensitive valve for opening and closing the bypass line is provided on the inner side of the end plate such that the temperature-sensitive valve is opened when an excessive amount of condensed water is introduced into the inlet of the stack during cold start-up, thereby easily discharging the excessive amount of condensed water present in the inlet of the stack through the bypass line.

3 Claims, 10 Drawing Sheets

< Contraction of Paraffin material at low temperature >

FIG.4

< Expansion of Paraffin material at high temperature >

Cell adjacent to inlet of stack

TEMPERATURE-SENSITIVE BYPASS DEVICE FOR DISCHARGING CONDENSED WATER FROM FUEL CELL STACK

CROSS-REFERENCE TO RELATED APPLICATION

This application claims under 35 U.S.C. §119(a) the benefit of Korean Patent Application No. 10-2010-0108063 filed Nov. 2, 2010, the entire contents of which are incorporated herein by reference.

BACKGROUND (a) Technical Field

The present invention relates to a bypass device for a fuel cell stack. More particularly, it relates to a temperature-sensitive bypass device for discharging condensed water from a fuel cell stack, which can easily discharge an excessive amount of condensed water introduced into the fuel cell stack during cold start-up or during initial operation, thus ensuring stable operation of the fuel cell stack.

(b) Background Art

Figure 10:
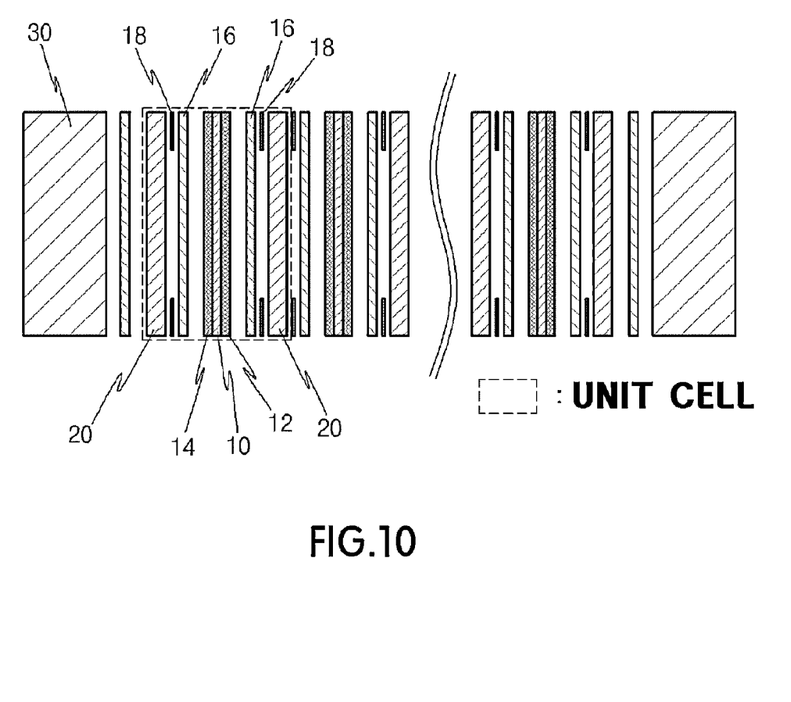
FIG. 10 is a schematic diagram showing the configuration of a typical fuel cell stack.

First, the configuration of a fuel cell stack will be briefly described with reference to FIG. 10.

A membrane-electrode assembly (MEA) is positioned in the center of each unit cell of the fuel cell stack, and the MEA comprises a solid polymer electrolyte membrane 10, through which hydrogen ions (protons) are transported, and an electrode/catalyst layer such as a cathode ("air electrode") 12 and an anode ("fuel electrode") 14, in which an electrochemical reaction between hydrogen and oxygen takes place, disposed on each side of the polymer electrolyte membrane 10.

Moreover, a gas diffusion layer (GDL) 16 and a gasket 18 are sequentially stacked on both sides of the MEA, where the cathode 12 and the anode 14 are located. A separator 20 including flow fields, through which reactant gases (such as hydrogen as a fuel and oxygen or air as an oxidant) are supplied and coolant passes, is located on the outsides of each GDL 16.

After several hundreds of unit cells are stacked, an end plate 30 for supporting and fixing the unit cells is connected to each end of the fuel cell stack. Further, a current collector for collecting electricity generated in the stack and supplying the electricity to the outside is mounted on the inside of each end plate 30.

An oxidation reaction of hydrogen occurs at the anode 14 of the stack to produce hydrogen ions (protons, $H^+$) and electrons ($e^-$) by a catalyst disposed in the electrode/catalyst layer. The hydrogen ions and electrons are transmitted to the cathode 12 through the electrolyte membrane 10 and the separator 20. At the cathode 12, water is produced by the electrochemical reaction between the hydrogen ions and electrons transmitted from the anode 14 and the oxygen-containing air. Electrical energy generated by the flow of electrons is supplied to a load that uses the electrical energy through the current collector of the end plate 30.

The above-described polymer electrolyte membrane fuel cell typically operates at a low temperature of 60 to 90° C., and thus efficient water management is necessary.

In particular, when an excessive amount of condensed water is introduced into the stack during abnormal operation, such as cold start-up or during low power operation for a long time, the condensed water interferes with the efficient supply of reactant gases. As a result, the performance and durability of a fuel cell system is reduced.

For example, the condensed water present in fuel (hydrogen and oxygen in air) supply lines or in a hydrogen recirculation line is introduced into the stack at the same time during cold start-up, which causes rapid deterioration in performance of a cell adjacent to an inlet of the stack.

Moreover, when the fuel cell system operates at low power operation for a long time, the water produced by the reaction is continuously circulated under conditions where the temperature of the stack is not very high, which causes deterioration in performance of the fuel cell.

Figure 8:
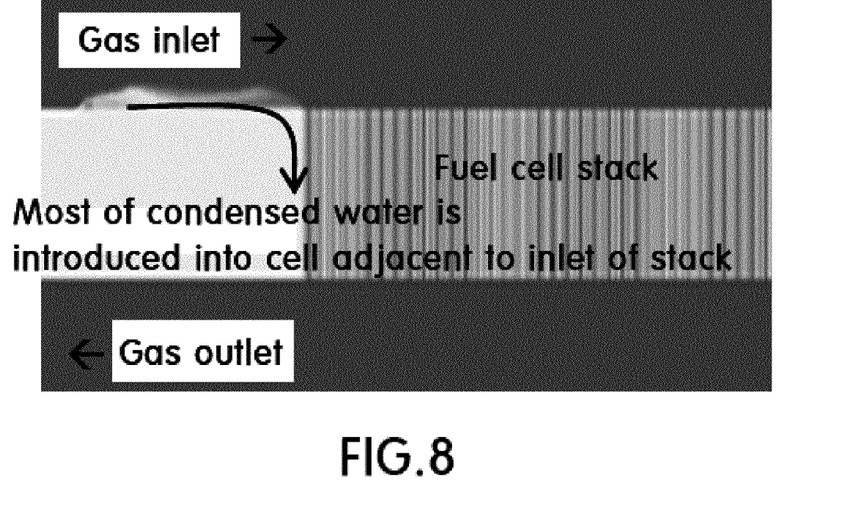
FIGS. 8 and 9 are graphs showing that an excessive amount of condensed water is introduced into the cell adjacent to the inlet of the stack during cold start-up.
Figure 9:
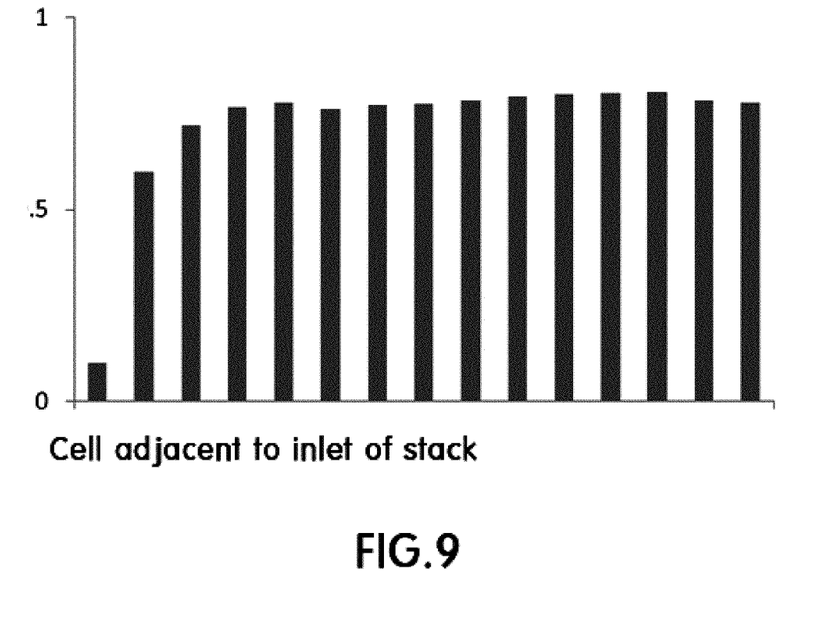

As shown, for example, from the test results in FIGS. 8 and 9, the excessive amount of condensed water separated from the reactant gases (hydrogen and oxygen in air) and most of the condensed water was introduced into the cell adjacent to the inlet of the stack during cold start-up of the vehicle equipped with the fuel cell stack.

In an attempt to solve this problem caused by the condensed water, a water trap or gas/liquid separator has been provided at the front and rear ends of the stack to remove the condensed water. However, such water traps and gas/liquid separators only separate a small amount of water droplets mixed with the gaseous fuel, and they do not remove the excessive amount of condensed water introduced and accumulated in the inlet of the stack.

Accordingly, there remains a need in the art for an apparatus and method for discharging condensed water from a fuel cell stack.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an improved bypass device for discharging condensed water from a fuel cell stack. In particular, a bypass device is provided in which a bypass line is disposed between an end plate and a separator located at the outermost cell adjacent to an inlet of the fuel cell stack. According to preferred embodiments, the bypass device is temperature-sensitive and, for example, a temperature-sensitive valve for opening and closing the bypass line can be further provided. According to certain embodiments, the temperature-sensitive valve is disposed on the inner side of the end plate such that the temperature-sensitive valve is opened when an excessive amount of condensed water is introduced into the inlet of the stack during cold start-up. It is, thus, possible to easily discharge excessive amounts of condensed water present in the inlet of the stack through the bypass line to the outside.

In one aspect, the present invention provides a temperature-sensitive bypass device for discharging condensed water from a fuel cell stack, the device comprising: a bypass line configured for discharging condensed water, the bypass line provided between an end plate and a separator located at the outermost cell adjacent to an inlet of the fuel cell stack; and a temperature-sensitive valve provided in the bypass line, the opening and closing of which depends on the temperature of the fuel cell stack.

In a preferred embodiment, the bypass line extends from a reactant gas inlet manifold of the end plate to a reactant gas outlet manifold of the end plate.

In another preferred embodiment, the bypass line extends from a reactant gas inlet manifold of the end plate to a lower end of the end plate connected to the outside.

In still another preferred embodiment, the bypass line is separately formed and installed at a position adjacent to the outer surface of the separator at the outermost side.

In yet another preferred embodiment, the temperature-sensitive valve comprises: a cylinder internally mounted on one side of the bypass line; a paraffin material or the like disposed at the rear of the internal space of the cylinder; a piston disposed in front of the paraffin or similar material; a valve plate integrally formed on the front end of the piston to open and close the bypass line; and a spring or the like supported between the front side of the piston and the front inner side of the cylinder.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 10: polymer electrolyte membrane | 12: cathode |
| 14: anode | 16: gas diffusion layer |
| 18: gasket | 20: separator |
| 30: end plate | 32: bypass line |
| 34: inlet manifold | 36: outlet manifold |
| 40: temperature-sensitive valve | 41: cylinder |
| 42: paraffin material | 43: piston |
| 44: valve plate | 45: spring |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a bypass device, particularly a temperature-sensitive bypass device, for discharging condensed water from a fuel cell stack. According to various embodiments of the present invention, a valve of a bypass line is opened when an excessive amount of condensed water is introduced into a cell adjacent to an inlet of the stack during cold start-up to thereby discharge the condensed water to the outside. Since most of the condensed water is evaporated and removed when the fuel cell stack reaches a normal operating temperature, the valve of the bypass line can subsequently be closed to prevent reactant gas (hydrogen or oxygen in air) from leaking to the outside.

As shown in the figures, a bypass line 32 for discharging condensed water is provided between a separator 20 located at the outermost cell adjacent to an inlet of the fuel cell stack and an end plate 30 closely bonded to the separator 20. The bypass line 32 is preferably provided on the inner side of the end plate 30 facing the separator 20. A valve, such as a temperature-sensitive valve 40 which is opened and closed depending on the temperature of the stack, is provided within the bypass line 32.

Manifolds for supplying reactant gases, which are connected to each other, are formed on the top of the end plate 30 and the separator 20. The manifolds for supplying reactant gases comprise a hydrogen inlet manifold, a coolant inlet manifold, and an air inlet manifold, which have a separate space and are preferably arranged in parallel to each other.

Figure 1:
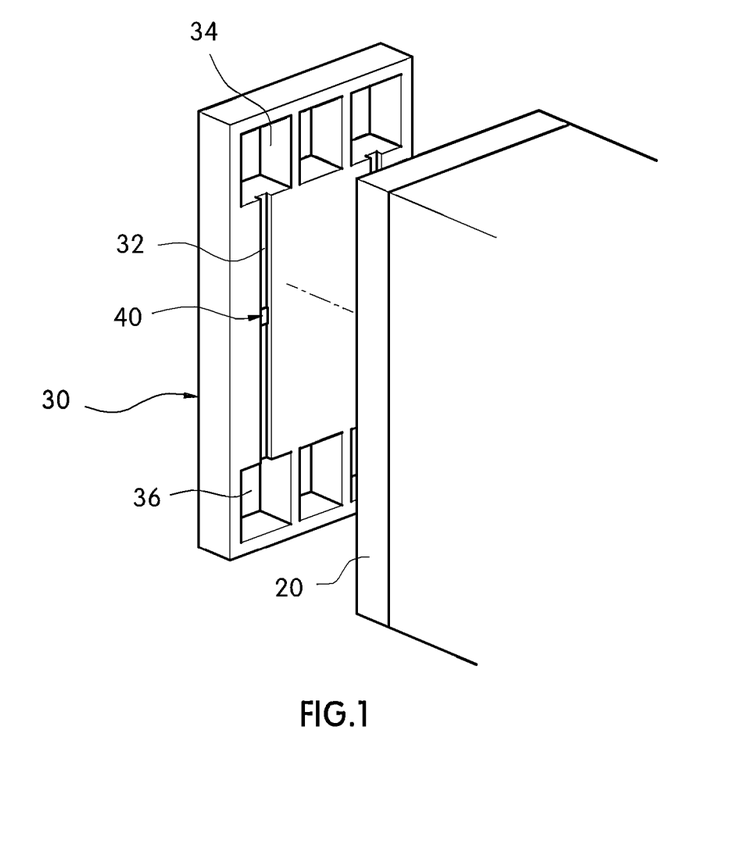
FIG. 1 is a schematic diagram showing a temperature-sensitive bypass device for discharging condensed water in accordance with one embodiment of the present invention.

According to some embodiments of the present invention, for example as shown in FIG. 1, the bypass line 32 formed on the inner side of the end plate 30 extends from a reactant gas inlet manifold 34 to a reactant gas outlet manifold 36. The reactant gas inlet manifold 34 is configured for supplying reactant gas to the stack, while the reactant gas outlet manifold 36 is configured for discharging the gas after the reaction from the stack.

Figure 2:
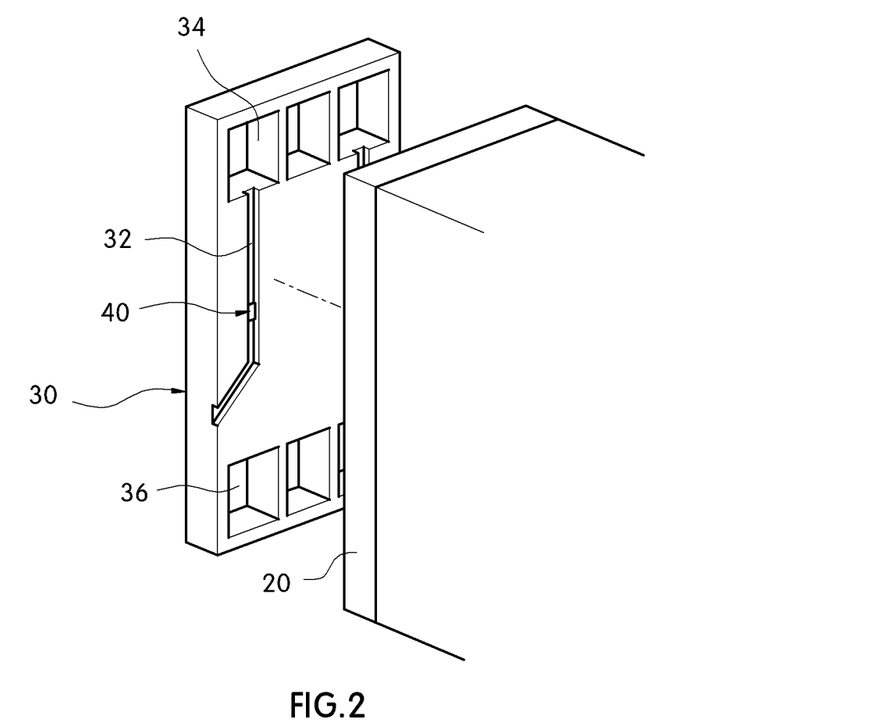
FIG. 2 is a schematic diagram showing a temperature-sensitive bypass device for discharging condensed water in accordance with another embodiment of the present invention.
Figure 3:
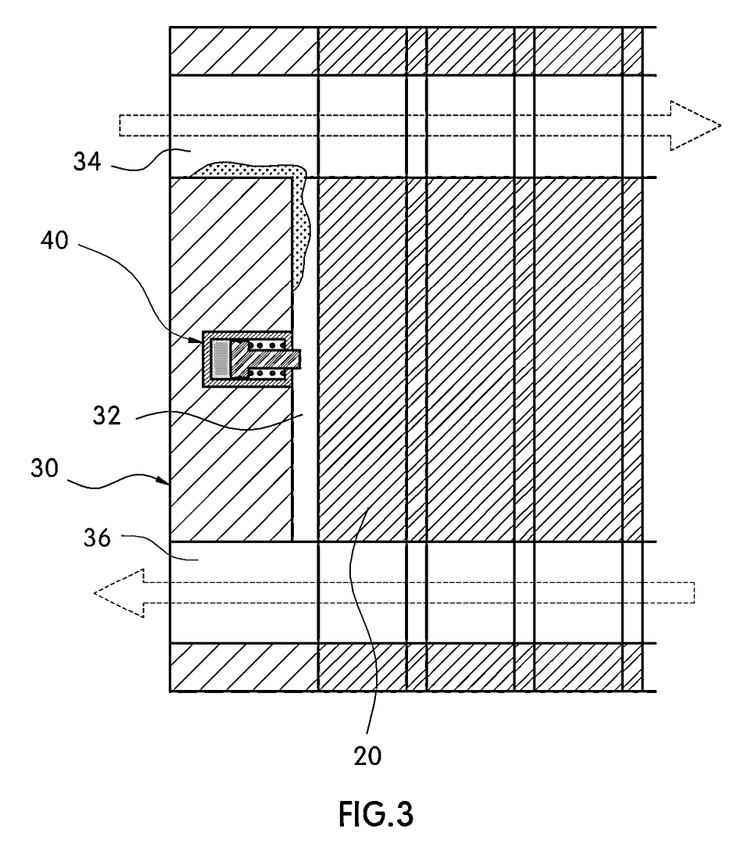
FIG. 3 is a cross-sectional view showing a temperature-sensitive bypass device for discharging condensed water in accordance with a preferred embodiment of the present invention.

According to other embodiments, for example as shown in FIG. 2, the bypass line 32 formed on the inner side of the end plate 30 extends from the reactant gas inlet manifold 34 to a lower end of the end plate 30 in connection with to the outside (e.g. so as to provide an opening to the external atmosphere).

According to other embodiments, the bypass line 32, which can comprise a narrow tube, may be formed separately and can be installed at a position adjacent to the outer surface of the separator 20. For example, the bypass line 32 in the form of a narrow tube may be disposed and bonded between the end plate 30 and the separator 20 at the outermost side, and the temperature-sensitive valve 40 may be provided in the bypass line 32.

The temperature-sensitive valve 40 according to an embodiment of the present invention can be a valve using paraffin material or the like that is automatically opened when the temperature of the stack is low and that is automatically closed when the temperature of the stack is increased to the normal operation temperature of the stack.

To form the temperature-sensitive valve 40, a cylinder 41 can be internally mounted at any suitable position of the bypass line 32, which can be directly formed on the end plate 30 or adjacent to the separator 20 at the outermost side. A paraffin material 42 or the like, which expands and contracts according to the surrounding temperature, can be suitably disposed within the cylinder, for example at the rear of the internal space of the cylinder 41 as shown in FIGS. 4 and 5.

Figure 4:
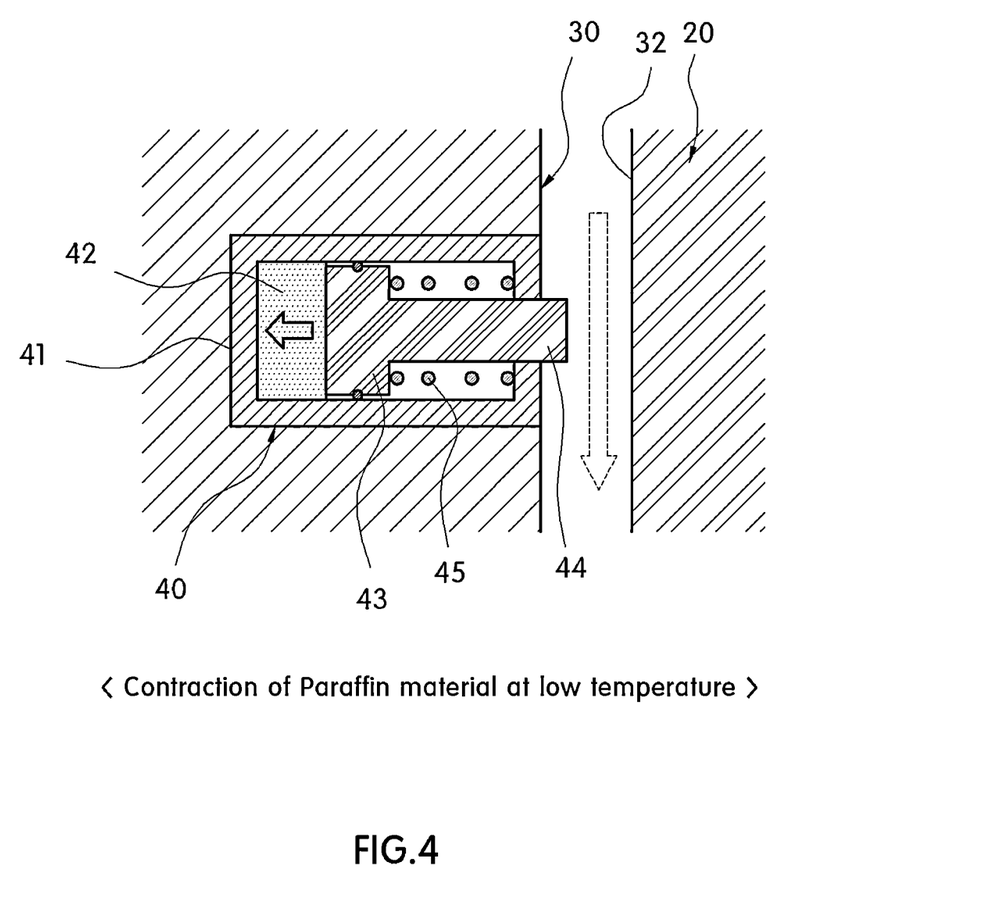
FIGS. 4 and 5 are cross-sectional views showing the operation of the temperature-sensitive bypass device for discharging condensed water in accordance with an embodiment of the present invention.
Figure 5:
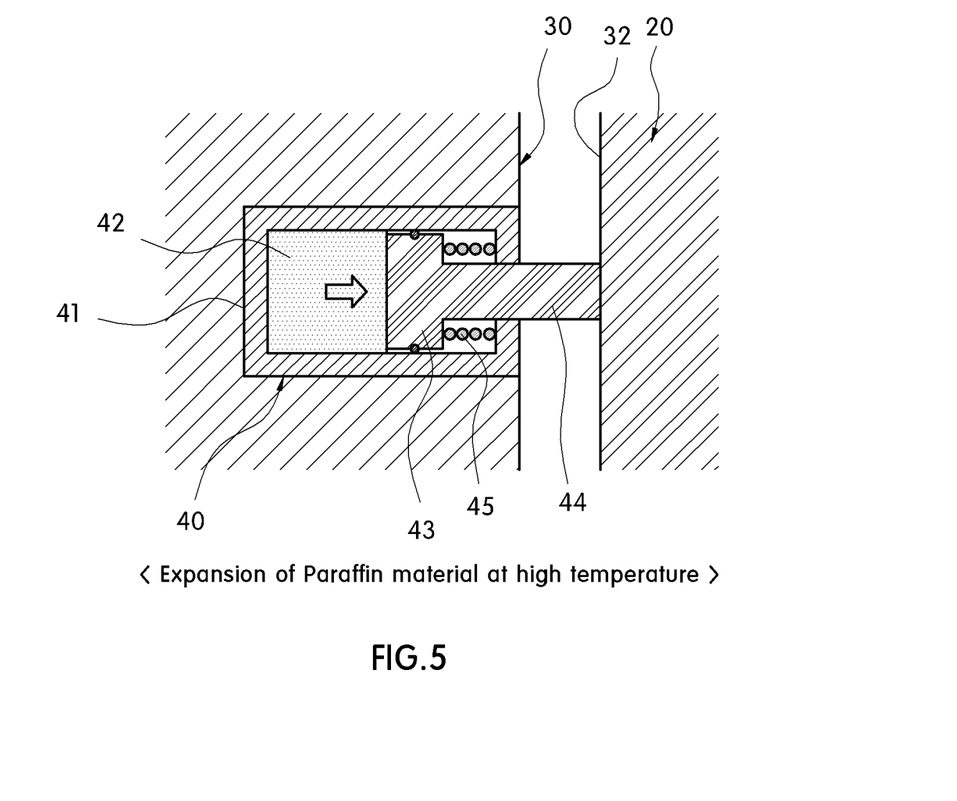
Figure 6:
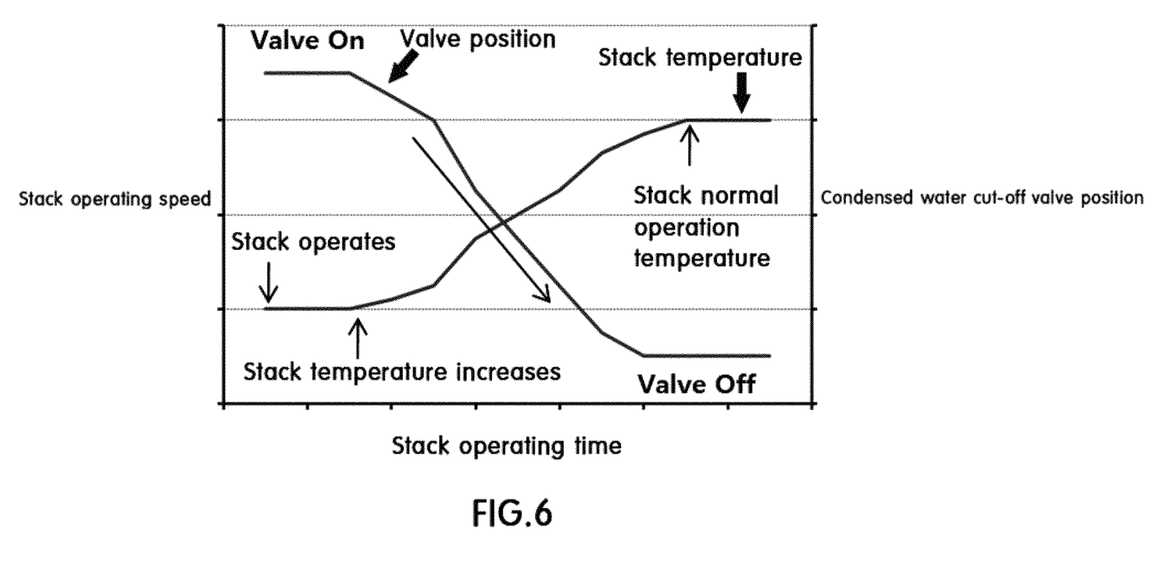
FIG. 6 is a graph showing the on/off operation of a temperature-sensitive valve of the temperature-sensitive bypass device for discharging condensed water in accordance with the present invention.

A piston 43 or the like can further be disposed relative the paraffin material 42, for example in front of the paraffin material 42 inside the cylinder 41 as shown in FIGS. 4 and 5. A valve plate 44 can further be disposed, for example as shown projecting from the front end of the cylinder 41 to open and close the bypass line 32. The valve plate 44 can, in some embodiments, be integrally formed on the front end of the piston 43.

A spring 45 or the like can be further suitably interposed between the piston 43 and the cylinder 41, for example as shown between the front side of the piston 43 and the front inner side of the cylinder 41.

Next, the operation of the temperature-sensitive bypass device for discharging condensed water according to the present invention will be described.

As mentioned above, during cold start-up such as in winter conditions, the condensed water present in the fuel (hydrogen or oxygen in air) supply lines (e.g. a hydrogen supply line and an air supply line connected to the reactant gas inlet manifold), or the condensed water present in a hydrogen recirculation line is introduced into the cell adjacent to the inlet of the stack at the same time together with the reactant gases. This causes rapid deterioration in performance of a cell adjacent to the inlet of the stack.

To solve this problem, according to an embodiment of the present invention, the paraffin material 42, which is disposed in the cylinder 41 of the temperature-sensitive valve 40, contracts during cold start-up of the fuel cell stack.

Subsequently, the piston 43 is moved backward towards the paraffin material 42 by the elastic restoring force of the spring 45 being compressed between the front side of the piston 43 and the front inner side of the cylinder 41, and thus the valve plate 44 integrally formed with the piston 43 is moved backward. As a result, the bypass line 32, which is directly formed on the end plate 30 or is adjacent to the separator 20, is in an opened state (for example, as shown in FIG. 4).

Therefore, the condensed water flows through the bypass line 32, before it is introduced into the cell adjacent to the inlet of the stack together with the reactant gases, and the condensed water flowing through the bypass line 32 is discharged through the reactant gas outlet manifold 36 or to the outside (external the fuel cell stack).

As a result, the condensed water is not introduced into the cell adjacent to the inlet of the stack, and thus it is possible to maintain the performance of all cells of the stack as well as the cell adjacent to the inlet of the stack.

Meanwhile, under normal operation conditions of the fuel cell stack after the cold start-up, the temperature of the stack is sufficiently increased, and thus most of the condensed water in the stack is evaporated and removed. As a result, an excessive amount of condensed water is not present in the stack.

At this time, a large amount of fuel (hydrogen or oxygen in air) supplied to the stack may be introduced into the bypass line 32 resulting in waste of the fuel. The bypass line 32 can, thus, be closed so as to prevent this waste.

In particular, when the temperature of the stack is sufficiently increased during normal operation, the paraffin material 42 disposed in the cylinder 41 of the temperature-sensitive valve 40 expands. The expanding paraffin material 42 pushes the piston 43 forward and, at the same time, the valve plate 44 integrally formed with the piston 43 moves forward to close the bypass line 32 (for example, as shown in FIG. 5).

As a result, the reactant gases supplied to the stack do not flow through the bypass line 32 but, rather, are supplied to the cell adjacent to the inlet of the stack, thus ensuring the normal supply of fuels.

Figure 7:
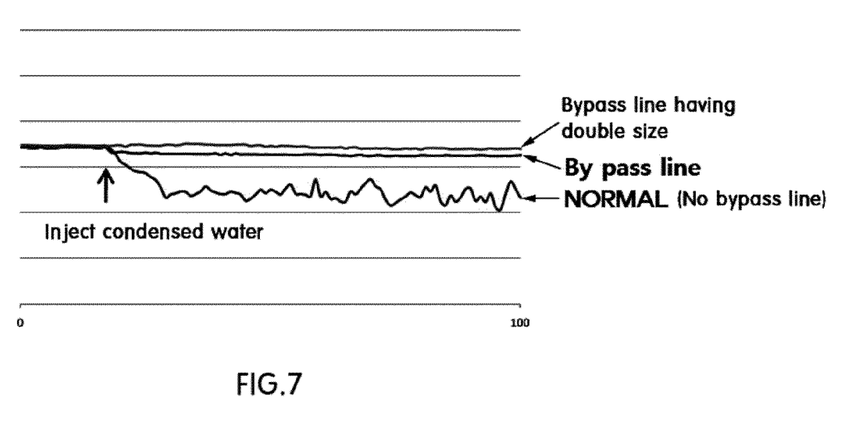
FIG. 7 is a graph showing changes in performance of a cell adjacent to an inlet of a fuel cell stack with the elapse of time after injecting condensed water into the cell adjacent to the inlet of the stack.

In accordance with this embodiment, the opening and closing of the temperature-sensitive valve 40 of the bypass line 32 is determined according to the temperature of the stack (e.g. as shown in FIG. 7). Thus, the condensed water introduced into the cell adjacent to the inlet of the stack during cold start-up can be discharged to the outside by opening the temperature-sensitive valve 40 of the bypass line 32. Further, when the fuel cell stack reaches a normal operating temperature after the cold start-up, the temperature-sensitive valve 40 of the bypass line 32 is closed to prevent the reactant gas (hydrogen or oxygen in air) from leaking to the outside via the bypass line.

In a test example of the present invention, after (a) an end plate with a bypass line, (b) an end plate with a bypass line having a size double that in (a), and (c) an end plate with no bypass line were connected to a fuel cell stack, respectively, and the condensed water was injected into the cell adjacent to the inlet of each stack, the change in voltage of the cell adjacent to the inlet of each stack was measured. The results are shown in FIG. 7.

As shown in FIG. 7, in the case of the end plate with the bypass line, the condensed water present between the end plate and the cell adjacent to the inlet of the stack was discharged, and thus there was no deterioration in performance of the cell adjacent to the inlet of the stack. On the other hand, in the case of the end plate with no bypass line, the condensed water was introduced into the cell adjacent to the inlet of the stack, and thus there was rapid deterioration in performance of the cell adjacent to the inlet of the stack.

As described above, the present invention provides the following effects. The bypass line opened and closed by the temperature-sensitive valve, which can be provided between the end plate and the separator located at the outermost cell adjacent to the inlet of the fuel cell stack, such that the temperature-sensitive valve is opened when an excessive amount of condensed water is introduced into the inlet of the stack during cold start-up. As such, the excessive amount of condensed water present in the inlet of the stack can be easily discharged through the bypass line to the outside. As such, the condensed water introduced into the cell adjacent to the inlet of the stack during cold start-up is discharged to the outside through the bypass line, such that the condensed water is not supplied to the cell adjacent to the inlet of the stack. It is, thus, possible to prevent rapid deterioration in performance of the cell adjacent to the inlet of the stack. As a result, the performance of the fuel cell stack can be improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A temperature-sensitive bypass device for discharging condensed water from a fuel cell stack formed of a plurality of stacked unit cells, and a plurality of end plates that support and fix the plurality of stacked unit cells, one of the end plates disposed on one end of the fuel cell stack and another of the end plates disposed on an opposite end of the fuel cell stack, the device comprising:
   a bypass line configured to discharge the condensed water, provided between the end plate and a separator located at an outermost cell adjacent to an inlet of the fuel cell stack, the bypass line included in the end plate and being on an inside of the end plate, the bypass line extending from a reactant gas inlet manifold to a reactant gas outlet manifold within the end plate; and
   a temperature-sensitive valve provided in the bypass line that is included in the end plate and being on an inside of the end plate, wherein opening and closing of the temperature sensitive valve depends on a temperature of the fuel cell stack such that the temperature-sensitive valve is automatically opened when the temperature of the fuel cell stack is a temperature so that the condensed water introduced into the outermost cell adjacent to the inlet of the fuel cell stack is discharged to an outside of the fuel cell stack through the bypass line and automatically closed when the temperature of the fuel cell stack is increased to an operation temperature of the fuel cell stack.

2. The device of claim 1, wherein the bypass line is separately formed and disposed at a position adjacent to an outer surface of the separator at an outermost side.

3. The device of claim 1, wherein the temperature-sensitive valve comprises:
   a cylinder internally mounted on one side of the bypass line, the cylinder having an internal space;
   a paraffin material disposed at a rear of the internal space of the cylinder;
   a piston disposed within the internal space of the cylinder in front of the paraffin material;
   a valve plate integrally formed on a front end of the piston; and
   a spring supported between the piston and an inner surface of the cylinder.

* * * * *